Oct. 21, 1941.　　J. P. ELLENBECKER　　2,259,808
AUTOMATIC CONTROL FOR STONE CUTTING AND FINISHING MACHINES
Filed Oct. 15, 1938　　4 Sheets-Sheet 1

Inventor
John P. Ellenbecker
By his Attorneys
Merchant & Merchant

Oct. 21, 1941.  J. P. ELLENBECKER  2,259,808
AUTOMATIC CONTROL FOR STONE CUTTING AND FINISHING MACHINES
Filed Oct. 15, 1938  4 Sheets-Sheet 2
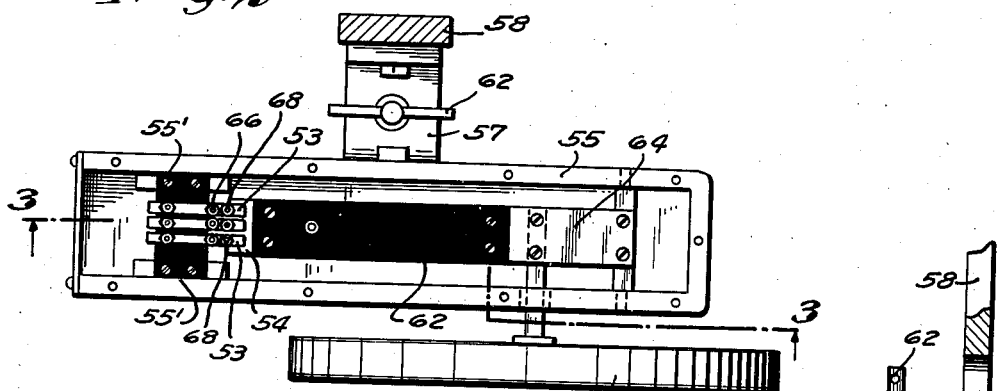
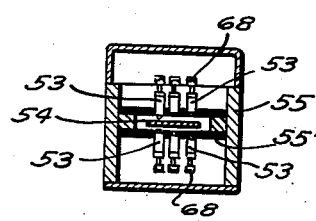
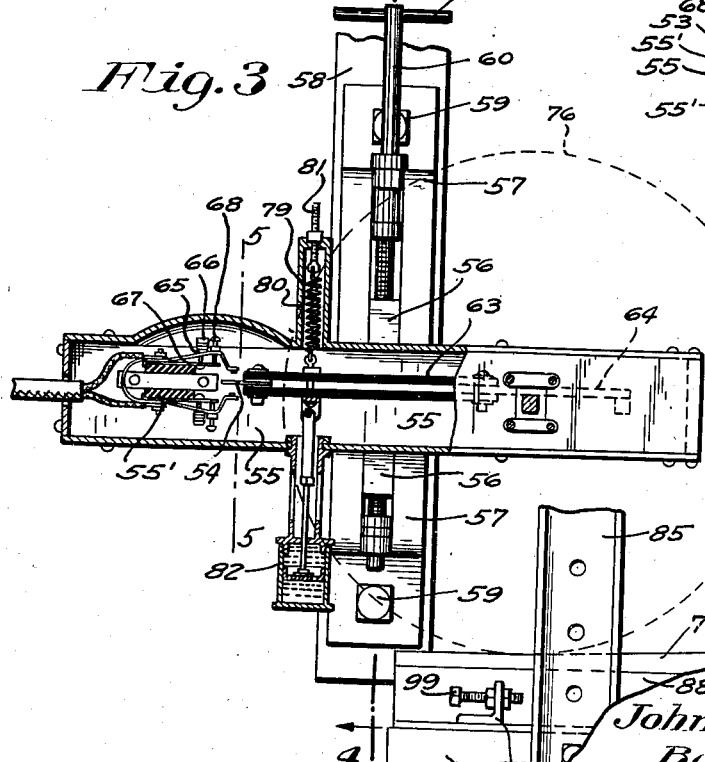
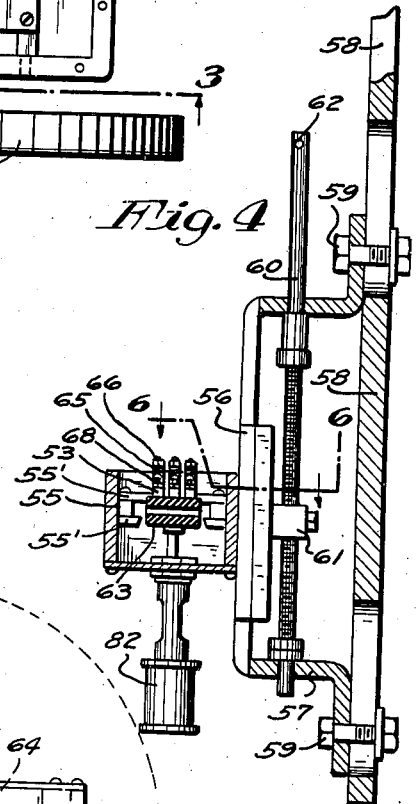
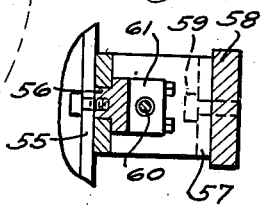
Inventor
John P. Ellenbecker
By his Attorneys
Merchant & Merchant

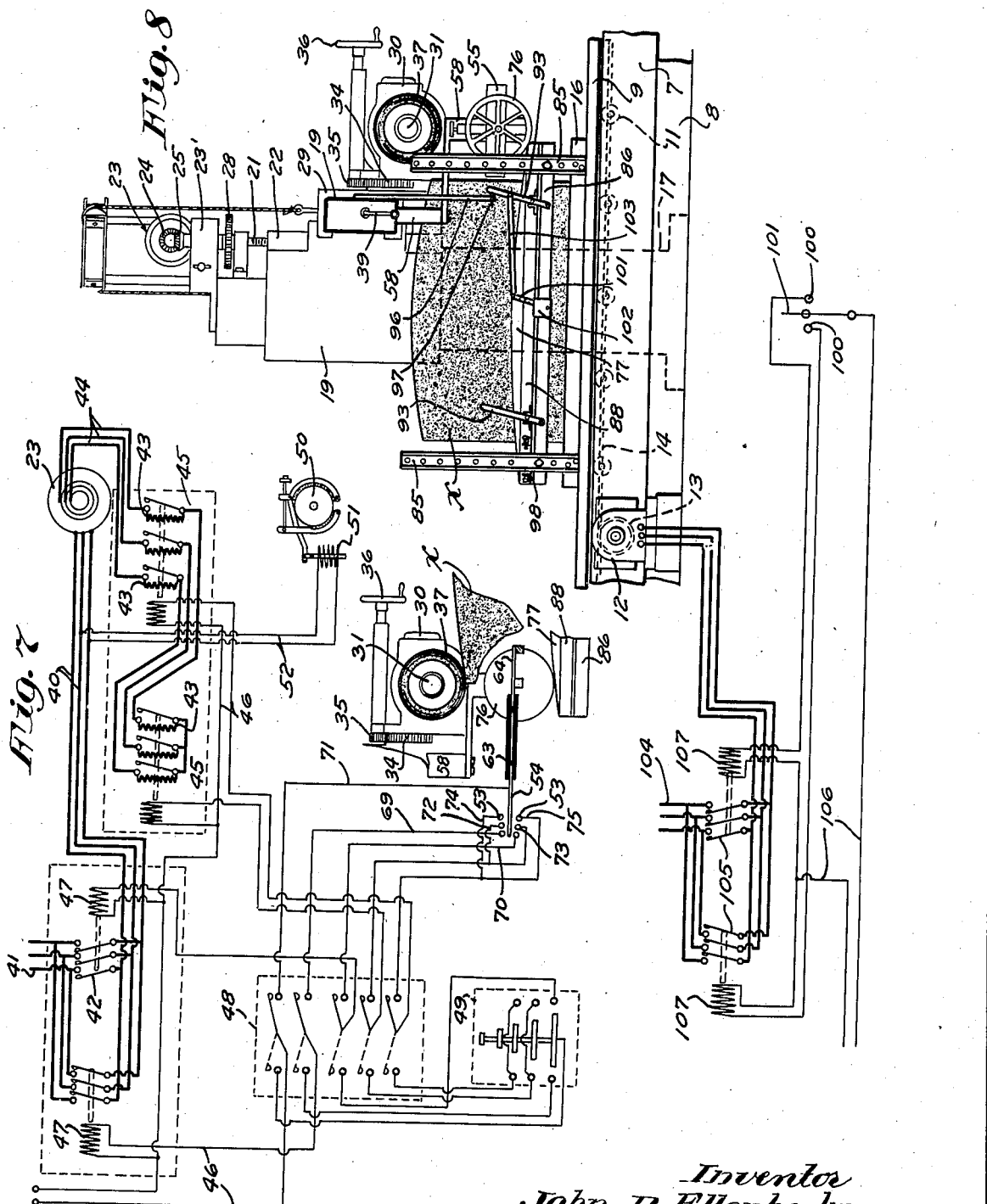

Oct. 21, 1941.   J. P. ELLENBECKER   2,259,808
AUTOMATIC CONTROL FOR STONE CUTTING AND FINISHING MACHINES
Filed Oct. 15, 1938   4 Sheets-Sheet 4
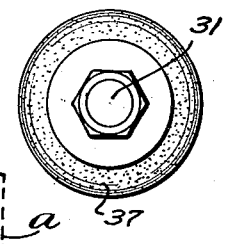
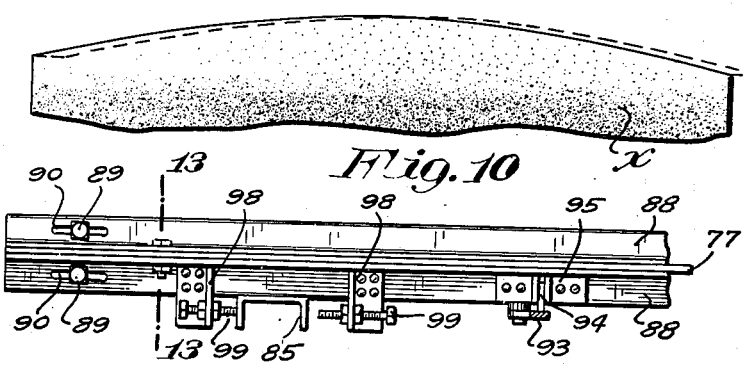
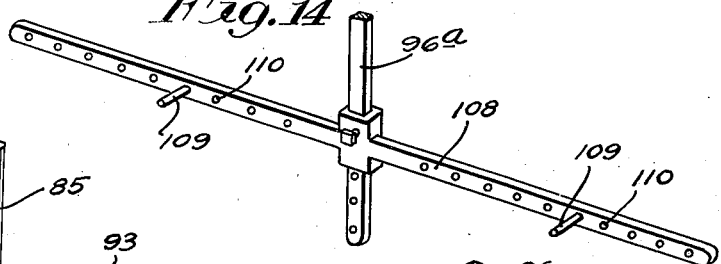
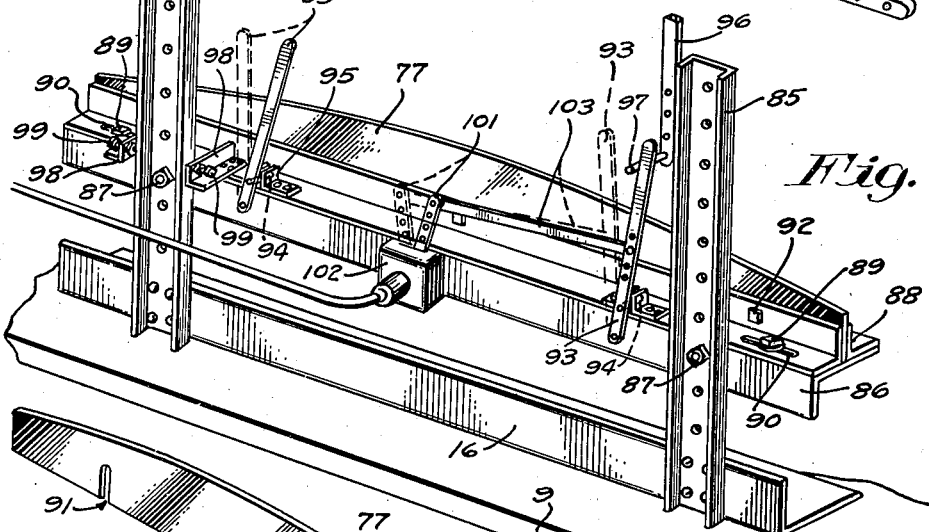
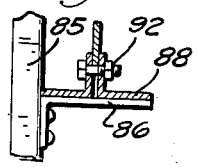
Inventor
John P. Ellenbecker
By his Attorneys Patented Oct. 21, 1941

2,259,808

UNITED STATES PATENT OFFICE 2,259,808

AUTOMATIC CONTROL FOR STONE CUTTING AND FINISHING MACHINES

John P. Ellenbecker, St. Cloud, Minn.

Application October 15, 1938, Serial No. 235,196

13 Claims. (Cl. 51—100)

My present invention is in the nature of an improvement on the "Automatic control for stone cutting and finishing machines" disclosed and claimed in my Patent 1,831,412 of date November 10, 1931. In the operation of the machine of my prior patent it was found that due to slack in certain of the parts and to a time loss in the movement of the stone from the back into engagement with the grinding wheel, there would be a change in relation between the starting of the stone cutting action in producing the reverse movements of the stone to and from the wheel or vice versa; and that to maintain the proper cutting relation between the stone and the grinding wheel a certain manual shifting of the stone is required to compensate for the inaccuracies above indicated.

My present invention is directed particularly to the correction of the fault or failure in the prior machine. This correction or improved action, namely the shifting of the template or stone in respect to the cutting wheel, by the present scheme is preferably accomplished automatically after the required correction has been determined and the machine once set for such corrections. A commercial machine embodying the features above indicated especially as applied to the machine of my prior patent is illustrated in the accompanying drawings wherein like characters indicate like parts throughout the several views.

Referring to the drawings;

Fig. 2 is a plan view of the differential motor controlling device, on an enlarged scale;

Fig. 3 is a view partly in side elevation and partly in section taken on the irregular line 3—3 of Fig. 2 with the tracer wheel indicated by broken lines and further fragmentarily illustrating a platen by means of broken lines and the template in side elevation;

Fig. 4 is a view partly in elevation and partly in section taken on the line 4—4 of Fig. 3;

Fig. 5 is a view partly in elevation and partly in section taken on the line 5—5 of Fig. 3;

Fig. 6 is a detail view principally in section taken on the irregular line 6—6 of Fig. 4;

Fig. 7 is a wiring diagram;

Fig. 8 is a side elevation of the machine with some parts broken away and with certain of the wiring indicated in diagram;

Fig. 9 is a perspective showing the feed table, the template, and elements of the control mechanism;

Fig. 10 is a detail in plan showing the template clamp or vice;

Fig. 11 is a fragmentary side elevation showing portions of the stone and its relation to the cutting wheel;

Fig. 12 is a perspective showing the template removed from working position;

Fig. 13 is a section taken on the line 13—13 of Fig. 10; and

Fig. 14 is a perspective showing portions of a modified tripping device.

Figure 1:
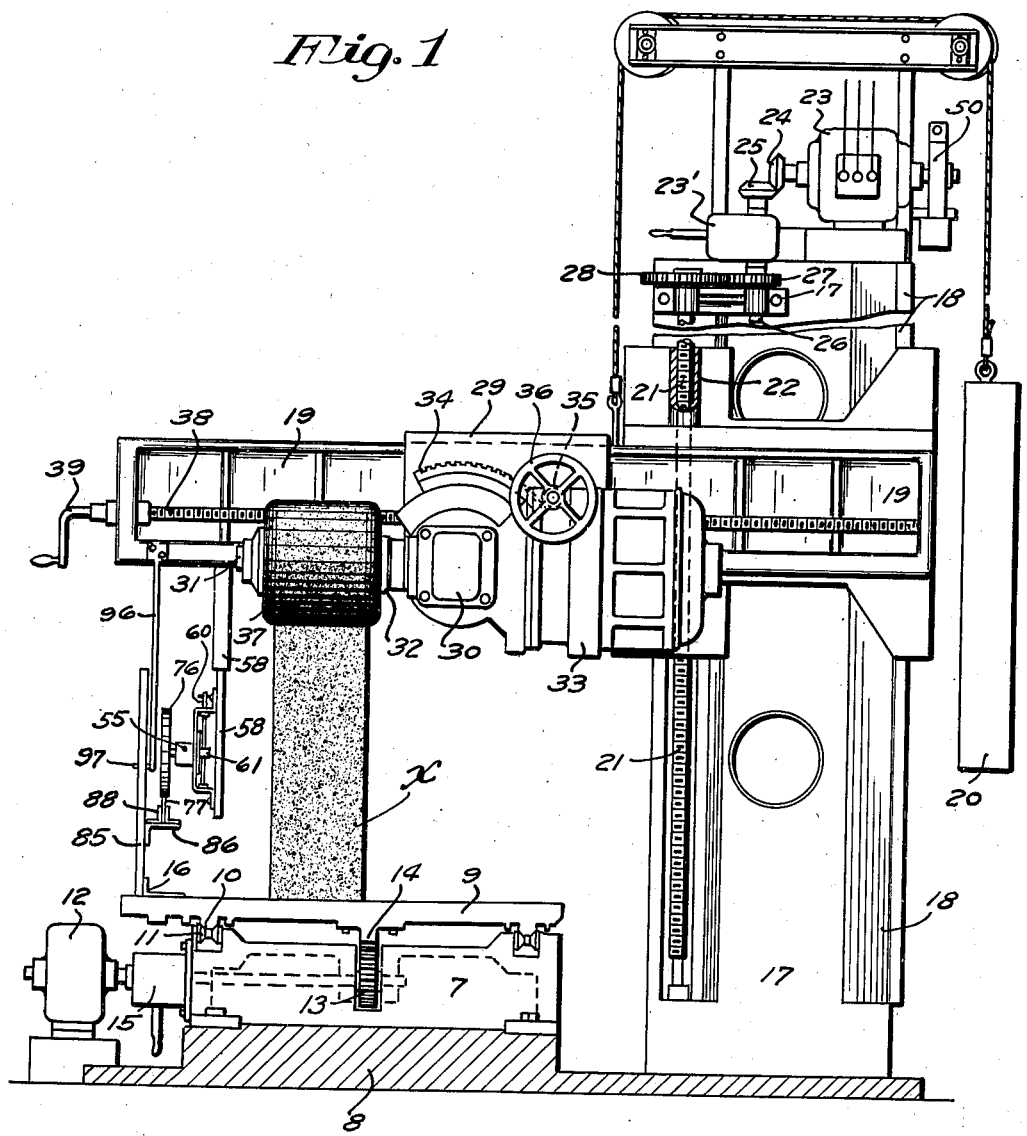
Fig. 1 is a front elevation of a stone cutting machine having the invention embodied therein.

Before describing in detail the present invention, which is an improvement particularly on the type of machine disclosed in my above identified patent, the description of the said prior machine will first be given as follows:

The numeral 7 indicates a base supported on and rigidly secured to a bed 8 and on which base a reciprocating platen or work table 9 is mounted. This work table 9 has on its under side a pair of rails 10 which rest in spool-like rollers 11 journaled on the base 7. To reciprocate the work table 9 there is provided an electric motor 12 which drives a gear 13 journaled on the base 7 and meshing with a rack 14 on the under side of said table. In the driving connections from the motor 12 to the gear 13 is a variable speed transmission mechanism diagrammatically illustrated and indicated, as an entirety, by the numeral 15. The direction of travel of the work table 9 may be reversed either by the motor 12 or the transmission mechanism 15. On the left hand side of the work table 9 is an upstanding longitudinally extended flange 16 for a purpose that will presently appear.

Mounted on the bed 8 at the right side of the base 7 is a heavy fixed upright post 17 having vertical ways 18 on which a horizontal cross rail 19 is mounted for parallel raising and lowering movements over said base. This cross rail 19 is held substantially counter-balanced by a weight 20 and is raised and lowered by a long vertical feed screw 21 journaled at its ends in bearings on the post 17 and works in a nut-acting member 22 secured to the cross rail 19 and held against rotation. An electric motor 23 is provided for operating the feed screw 21 and has on its armature shaft a miter pinion 24 which meshes with a miter gear 25 on the upper end of a short shaft 26 journaled in a bearing on the post 17. A spur pinion 27 on the shaft 26 meshes with a spur gear 28 on the upper end of the feed screw 21.

A variable speed transmission mechanism diagrammatically illustrated by the numeral 23' is interposed between the gear 25 and pinion 27 for varying the speed of the raising or lowering of the cross rail 19 in respect to the travel of the work table 9. The transmission mechanism 15 permits the speed of the work table 9 to be varied in respect to the speed at which the cross rail 19 may be raised or lowered.

A saddle 29 is mounted on the cross rail 19 for horizontal sliding movement and attached thereto is a swivel 30 the axis of which is horizontal and extends parallel to the line of travel of the work table 9. Journaled in the swivel 30 is a spindle 31 to which is secured a tool head 32. The spindle 31 is driven by an electric motor 33 carried by the swivel 30. Said swivel 30 is turned about its axis by means of a segmental rack 34 on the saddle 29 and a cooperating pinion 35 which may be operated, at will, by a hand wheel 36. Secured to the tool head 32 is a grinding wheel 37. The saddle 29 is moved back and forth on the cross rail 19 by a cross feed screw 38 journaled in bearings on said cross rail and works in a nut-acting member, not shown, on said saddle. A hand-crank 39 is provided for operating the cross feed screw 38.

By turning the feed screw 21 the cross rail 19 may be raised or lowered, and hence, the grinding wheel 37, and by operating the cross feed screw 38 the saddle 29 may be moved back and forth on the cross rail 19 to axially adjust said grinding wheel transversely of the feed table 9. The swivel 30 may be turned about its axis by manipulating the hand wheel 36 to move the grinding wheel 37 in the arc of a circle between vertical and horizontal positions.

The electric motor 23 may be of any reversible variable speed type for either direct or alternating currents of standard voltage and frequency. There is illustrated in the drawings a three phase alternating current motor of the slip ring type. The lead wires 40 of said motor are connected to power supply wires 41 by a magnetic reversing switch 42 and the speed of said motor is controlled by a series of resistances 43, as shown two, in an induced secondary three phase circuit 44 that leads from the motor 23. Two relays 45 in a circuit 46 of a lower voltage than the power circuit 41 are provided for shunting the current around one or both resistances 43 to increase the speed of the motor 33. Two electromagnets 47 in the circuit 46 are provided for operating the reversing switch 42 and interposed in said circuit is a hand-operated double-throw multiple switch 48 for manually controlling the reversing switch 42 and when said double-throw switch is in neutral position the reversing switch 42 is open. Also interposed in the circuit 46 is a hand controller 49 for closing the circuit 46 to energize either one of the magnets 47 for reversing the motor 23 and to energize either one or both of the relays 45 for shunting the circuit around either one or both resistances 43 to vary the speed of the motor 23.

An automatic magnetic brake 50 is provided for the motor 23 and the circuit of its magnet 51 is indicated by the numeral 52 and leads from the motor fed circuit 40. As is well known, this type of brake 50 will automatically release when the motor circuit 40 is closed by the reversing switch 42 and will set when said circuit is open, thus preventing the motor 23 from being operated by momentum.

Referring now in detail to the automatic differentially-acting controlling device, the numeral 53 indicates a plurality of spaced relatively fixed contacts and the numeral 54 indicates a cooperating movable contact. Said fixed contacts 53 are arranged in two series cooperatively arranged one on each side of neutral position of the movable contact 54. These contacts 53 and 54 are mounted in a box-like casing 55 having a displaceable cover and the body of said casing is rigidly secured to a cross head 56 mounted in ways on a relatively fixed support 57. This support 57 is mounted on a heavy depending bar 58 secured to the under side of the cross rail 19 between the flange 16 and post 17 and holds the casing 55 above said flange. The support 57 is secured to the bar 58 for vertical adjustment by nut-equipped bolts 59 which extend through holes in the upper and lower ends of said support and vertical slots in said bar.

To vertically adjust the casing 55 on its support 57 there is provided a micrometer screw rod 60 journaled in bearings on the support 57 and works in a nut-acting member 61 rigidly secured to the cross-head 56 and having in its upper end a turning pin 62 by which said micrometer screw rod 60 may be operated.

The upper and lower series of contacts 53 are secured to a pair of vertically spaced members 55' which extend transversely through the casing 55 and secured to the sides thereof.

The two series of fixed contacts 53 are spaced the one above the other with the movable contact 54 extending horizontally therebetween. This movable contact 54, as shown, is in the form of a flat finger, rigidly secured to and between a pair of spaced insulating members 63, which, in turn, are rigidly secured to the outer end of a horizontal arm 64 pivoted to the casing 55 for vertical movement to carry the movable contact 54 into engagement with the contact 53 of either series.

It is important to note, by reference to Figs. 3, 5 and 7, that the movable contact 54 when in neutral position is midway between the two series of contacts 53 and out of contact therewith. It is also important to note that the contacts 53 of each series are successively and progressively farther away from neutral position of the movable contact 54, reading from the left to the right in respect to Figs. 5 and 7. Each contact 53 is yieldingly pressed toward the movable contact 54 by a coiled spring 65 on a nut-equipped bolt 66 secured to a fixed stop plate 67 on one of the insulating members 55' and under the respective contact 53. The approaching movement of each contact 53 toward the contact 54 is limited by an adjustable screw 68 secured to said contact 53 and normally impinging against the stop plate 67.

The two left hand contacts 53 are provided for closing the circuits for the reversing switch 42 and connected, the upper one by a wire 69 to the switch 48 and the lower one by a wire 70 to said switch 48 and the movable contact 54 is connected by a wire 71 to the switch 48. When the movable contact 54 is in engagement with the upper left-hand contact 53 the circuit 46 is closed energizing the left hand magnet 47 which operates the switch 42 to reverse the motor 23 for movement in a direction to elevate the grinding wheel 37. A reverse or downward movement of the movable contact 54 will engage the lower left hand contact 53, close the circuit 46, energizing the right hand magnet 47 which operates the switch 42 to reverse the motor 23 for rotation in the proper direction to lower the grinding wheel 37.

The two intermediate contacts 53 are connected to the switch 48, the upper one by a wire 72 and the lower one by a wire 73 and when the movable contact 54 is in engagement with either one of said intermediate contacts, the left hand relay 43 will be energized and operated to shunt the circuit around the left hand resistance 43 and thereby cause the motor to operate at intermediate speed. Wires 74 and 75 connect the upper and lower right hand contacts 53, respectively, to the switch 48. When the movable contact 54 is in engagement with either one of these right hand contacts 53, the circuit 46 is closed and the right hand relay 45 energized and operated to the circuit around the right hand resistance 43 and thereby cause the motor 23 to operate at high speed.

It will be understood that when the movable contact 54 is in engagement with either one of the left hand contacts 53 the motor 23 is operating at low speed and when said movable contact is moved into engagement with either one of the intermediate contacts 53 the engaged left hand contact will yield to permit such movement and likewise the engaged intermediate contact 53 will yield to permit the movable contact 54 to engage one of the right hand contacts 53.

The movable contact 54 is automatically operated by a tracer wheel 76 and a cooperating template 77 on which said wheel is arranged to run. This wheel 76 is journaled on a trunnion which extends transversely of the arm 64 and is rigidly secured thereto, see Figs. 2 and 3. Said template 77 is cut from a thin sheet of metal or other suitable material and is rigidly but adjustably secured to the flange 16 by means later on described.

The counterbalancing spring 79 is provided for holding the tracer wheel 76 substantially balanced to take the majority of its weight from the template, but has sufficient weight on said template to keep the wheel 76 in contact therewith so that the wheel 76 will closely follow the template 77. This counter-balancing spring 79 is held in an upright tubular housing 80 on the casing 55, attached to the insulating members 63 and anchored to an adjusting screw 81 in the top of said housing. By adjusting the nut on the screw 81, the tension of the spring 79 may be varied, at will. To steady the action of the movable contact 54 and prevent undue vibrations, there is provided a dash pot 82 held suspended from the casing 55 and its piston rod is attached to the insulating members 63.

Mounted on the feed table 9 is a stone X, the top of which is to be cut by the grinding wheel 37 to the shape of the template 77. The weight of this stone X is sufficient to hold the same in position on the work table 9.

It is now the general practice to cut a template in the drafting or designing room to be used by a stone cutter in shaping a serpentine or other irregular surface. By the use of my automatic controlling device, the template is simply attached to the feed table 9 and the grinding wheel 37 automatically controlled thereby.

*Operation of machine so far described in detail*

It may be assumed that a stone to be cut is on the work table 9, aligned both longitudinally and transversely in respect to the grinding wheel 37, that a template is secured to said work table, that the grinding wheel 37 is raised and that the top of the stone is to be cut to the shape of the template. The template 77, as shown, has straight end portions and a raised intermediate portion that is on the arc of a circle.

The work table 9 is first moved to position one end of the stone under the grinding wheel 37 and the manually operated switch 48 set to cut out the automatic controlling device and connect the hand controller 49 in the circuit 46. This hand controller 49 is then operated to lower the grinding wheel 37 substantially into contact with the top of the stone and thereafter the hand switch 48 is operated to cut out the hand controller 49 and connect the automatic controlling devices in the circuit 46 and the switch 48. The final manual adjustment of the grinding wheel 37 for the first cut to be made on the stone is performed by means of the micrometer screw rod 60 which positions the automatic controlling device with its tracer wheel 76 resting on the straight end portion of the template 77 which corresponds to the same end of the stone over which the grinding wheel 37 is positioned. In this position of the tracer wheel 76 the movable contact 54 is in neutral position and the brake 50, for the motor 23, set. To adjust the automatic controlling device onto stones that vary considerably in height the support 57 may be raised or lowered on the bar 58.

The motor 12 for driving the work table 9 is next started to move the stone under the grinding wheel 37. Primarily, the top of the stone is square and the first cuts made by the grinding wheel 37 will only take off the corner portions of the stone and thereafter as the tracer wheel 76 comes into contact with the curved portion of the template 37 the movable contact 54 is lifted into engagement with the upper left-hand contact 53 which completes the circuit 46 through the wires 69, 71 and switch 48, energizes the left hand magnet 47 which operates the reversing switch 42 to cause the motor 23 to rotate in the proper direction to elevate the grinding wheel 37 by means of the feed screw 21. At the time the circuit for the motor 23 is closed the brake 50 is automatically released and said motor is operating at low speed.

Further lifting movement of the tracer wheel 76 by the curved portion of the template 77 will lift the movable contact 54 into engagement with the upper intermediate contact 53 which completes the circuit 46 through the wires 71, 72, switch 48 to the left hand relay 45 to operate the same and shunt the circuit through the wires 44 around the left hand resistance 43 and thereby cause the motor 23 to operate at intermediate speed.

The movable contact 54, when lifted still higher by the template 77, will engage the upper right hand contact 53 and thereby through the wire 74 close the circuit 46 through the right hand relay 45 which shunts the circuit 44 around the right hand resistance 43 and causes the motor to operate at higher speed. During the lifting of the movable contact 54, the upper series of yielding contacts 53 are successively and progressively picked up by said movable contact and held thereby.

At the time the tracer wheel 76 moves over the crown of the template 77, the movable contact 54 will return to neutral position and at which time the upper series of contacts 53 will be progressively and successively released by the movable contact 54 in reverse order from that in which they were picked up thereby and cause the motor to drop from high speed to intermediate speed and from intermediate speed to low speed and as the movable contact 54 moves out of engagement with the upper left hand contacts 53, the circuit of said motor is broken and the brake 50 automatically set to prevent the motor 23 from operating by momentum.

As the tracer wheel 76 moves downward on the curved portion of the template 77 the lower series of contacts 53 are engaged by the movable contact 54 in the same manner that the upper series of contacts 53 were engaged thereby and the action of reversing the motor and shunting the circuit 44 around the resistance 43 is also the same as that previously described except that the screw 21 is rotated in a reverse direction to lower the grinding wheel 37.

From the curved portion of the template 77 the tracer wheel 76 moves onto the rear straight end portion of said template and thereby causes the movable contact 54 to progressively release the lower series of contacts 53 in reverse order from that in which they were picked up and progressively decrease the speed of the motor 27 and finally open the circuit of said motor and set the brake 50 to prevent said motor from operating by momentum.

To make a second cut over the top of the stone, the automatic controlling device is manually lowered, say one-sixteenth of an inch by the micrometer screw rod 60, and the direction of travel of the work table 9 reversed so that the stone will be cut in an opposite direction from that in which the first cut was made, but in the same manner. This adjustment of the automatic controlling device may be repeated until the stone is cut to the proper shape.

Any desired number of contacts 53, which correspond with the intermediate and right hand contacts 53, may be used so that there will be considerable variation in the speed of the motor 23. For each pair of contacts 53 added, it will be necessary to add another resistance and correspondingly modify the switch 48 and hand controller 49. Various different kinds of cutting, grinding and finishing tools may be employed during the cutting of a stone and while the invention is shown embodied in a stone cutting machine, the same is equally well adapted for use where similar cutting action takes place. In the preferred arrangement of the apparatus illustrated, the maximum raising and lowering of the grinding wheel 37 is substantially that of the travel of the work table 9.

In some instances it might be desirable to provide a template in which it is necessary for the tracer wheel 76 to travel under the same rather than over the template as shown. In such a modification the spring 79 may be adjusted to cause the tracer wheel 76 to be lifted into contact with such a template.

The position of the tracer wheel 76 on the arm 64 is such that very slight vertical movement imparted to said wheel by the template 77 will materially increase the movement of the contact 54 so that slight changes in the angle of said template will cause the movable contact 54 to pick up or release the contacts 53 to vary the speed of the motor 23, and hence, the speed at which the grinding wheel 37 is moved vertically toward or from the work without stopping the motor 23, thus causing the grinding wheel 37 to cut true curves or inclined surfaces.

In place of feeding the stone horizontally to a cutting tool, the mechanism may be modified to feed said cutting tool horizontally to the work or the stone may be moved vertically into or out of engagement with the cutting tool.

The above detailed description is that of the machine of my prior patent and it will be understood that the improved features hereinafter described may be incorporated in or used as a part of various other machines for the same or analogous purposes. The features of the present improvement over the prior machine are illustrated in Figs. 8 to 14 inclusive. In this improved arrangement, the template 77, instead of being directly secured to the flange 16 of the reciprocating table or carriage 9 is indirectly separated from said table and flange as illustrated in Fig. 9 wherein the numeral 85 indicates columns originally secured to said flange 16 and rising from the table. The numeral 86 indicates the horizontal flange shelf that is rigidly secured to said columns with freedom for vertical adjustments by nut-equipped bolts 87 and are engageable through vertically spaced perforations in said columns. The template 77 is held between the upstanding flanges of parallel angle bars 88 that are mounted for limited sliding movements on the shelf 86 and are anchored thereto by machine screws 89 or the like that work through slots 90 in the horizontal flanges of said bars 88. To detachably anchor the template 77 to the upstanding flanges of the bars 88, there is, as shown, notches 91 that straddle bolts or pins 92 extended through the upstanding flanges of the bars 88 and connect said two bars 88 and the template for common sliding movements.

The sliding movements of the bars 88 and the template are produced automatically by means which include a pair of shifting levers 93, see Fig. 9, pivoted at their lower ends to the shelf 86 and provided with lateral projecting pins 94 that work through the upturned flanges of angle brackets 95 secured to the adjacent bar 88. In this way the levers 93, the sliding bars 88 and the template 77 are connected for simultaneous sliding movements.

At the ends of the reciprocating movements of the carriage, shift levers 93 will be engaged and moved by a relatively fixed stop device which, in one instance and as shown, is a lever shifting bar 96 rigidly secured to and depending from a fixed part of the machine, such as the cross rail 19. This lever shifting bar 96 is provided with a laterally projecting stop pin 97 that directly engages said levers 93.

Shifting movements of the template 77 and its supporting bars 88, under movements of the levers 93, is limited by adjustable stop devices which, as shown, include longitudinally spaced stop brackets 98 fixed to adjacent slide bars 88 and equipped with adjustable stop screws 99 that are engageable with opposite sides of one of the columns 85, see particularly Figs. 9 and 10.

For reversing the action of the carriage operating motor 12, there is provided an electrical control means that includes a reversing switch made up of fixed contacts 100 and a cooperating movable contact lever 101, diagrammatically shown in Fig. 8, and in Fig. 9 shown as applied in a switch box 102 from which projects the movable lever switch bar 101. The projecting end of this switch lever 101 is connected, by a link 103, to one of the shift levers 93. In the electric motor operating connections that are diagrammatically illustrated in Fig. 8, numeral 104 indicates high voltage alternating current leads, that are connected to the motor 12 through reversing switches 105. The switch contacts 100 control the low voltage circuit 106, one of the leads of which includes alternately operated solenoids 107 which, under operation of the reversing switch 100—101 alternately operate the high tension reversing switches 105.

We will now consider more definitely the operation of the mechanism above described whereby the template carried by the carriage 9 will be automatically shifted to compensate for slack in the mechanism and lag in the electric motor and other electrical connections such as the various solenoids or magnets.

Directing the attention now particularly to Fig. 11, let it be assumed that the carriage, the stone and the template have been moved from right toward the left to the extreme position shown by full lines in Fig. 11; and also let it be assumed that the determined lag is represented by the distance of the dotted line a from the adjacent end of the stone X and template 77. Without the automatic compensating device described, the correction could be made, at the end of each movement of the carriage, by manually shifting the template from its previous position to the dotted line position shown in Fig. 11. However, with the automatic mechanism, this correcting shifting movement is made automatically as follows. First, the amount of shifting movement to make the corrections is determined and the stop screws 99, Figs. 9 and 10, are adjusted to limit the shifting movement to meet that correction. Then when the carriage closely approaches the limit of its movement with the template and stone, pin 97 of lever actuating member 96 will engage one or the other of the levers 93 and impart that movement thereto that will automatically shift the members 88 and template 77 to the extent above indicated. Movement of the one lever 93 also causes movement of the other lever 93 so that when either one of the said levers is moved, as above described, the movable contact or lever 101 of the reversing switch will be moved to actuate the electric connections for reversal of the carriage driving motor 12. By means above described, it is the template that is moved to make the correction and this is the best arrangement because of its relative lightness, but theoretically the correction might be made by shifting of the stone itself or possibly by shifting of the grinding wheel.

Fig. 12 illustrates a somewhat modified form for the means of operating the shift switches. In this arrangement 96a indicates a fixed member that corresponds to the member 96 and on the end of which is adjustably but rigidly secured a horizontally extended actuating member 108 having longitudinally spaced and longitudinally adjustable pins or projections 109 insertable through holes or seats 110 in said member 108. In this arrangement the pins 109 will operate in lieu of the single pin 97. This actuating device of Fig. 12 is especially intended for use when the stone is very short in the direction of the movement of the carriage.

In the specification and drawings the cutting tool is a grinding wheel, but might in some cases take other form. The term carriage is used in a broad sense to include the reciprocating element that carries the template and stone or work being cut or formed. The work supporting portion may take various forms, but in the drawings is in the form of a raised support designated as a shelf.

What I claim is:

1. The structure defined in claim 10 in which said carriage actuating means includes a reversible electric motor, a supply circuit therefor and a reversing switch, which switch is actuated by the carriage at the extremes of its movement.

2. The structure defined in claim 11 in which said carriage actuating means includes a reversible electric motor, a supply circuit therefor and a reversing switch, which switch is actuated by the carriage at the extremes of its movement.

3. In a machine of the kind described, a carriage having a work support, power means for reciprocating said carriage, a template mounted on said carriage for limited shifting movements thereon in respect to the direction of travel of the carriage, means for shifting said template including a lever affording a shift connection between said carriage and template, a relatively fixed stop operative on said lever at the limits of the carriage movement to shift said template and thereby compensate for slack and lag in the carriage operating mechanism.

4. The structure defined in claim 3 in which the means for reciprocating said carriage includes a reversible electric motor, a supply circuit therefor including a reversing switch, and means connecting the movable element of said reversing switch for movement simultaneously with the movements of said template shifting lever.

5. In a machine of the kind described, a carriage having a work supporting portion, power means for reciprocating said carriage including a reversible electric motor, a circuit for said motor and a reversing switch in said circuit, a template mounted on said carriage for limited shifting movements in the direction of the travel of the carriage, a cutting tool, a tracer, subject to the action of said template, means whereby movements of the tracer, controlled by said template, control the pattern cutting movements of said tool, a shift lever connecting said template to said carriage for shifting movements, a fixed stop on the machine structure operative on said lever at the extremes of the carriage movement to shift said template, and a connection between said lever and the movable element of said reversing switch for reversing the action of the motor at the extremes of the carriage movement and a mounting for the tool constructed and operative to permit said tool to move under control of said pattern-determining template.

6. The structure defined in claim 5 in which said stop mechanism is adjustable to vary the extent of shifting movements of said template under the shifting means described.

7. The combination with two co-operating members one of which is a work support and the other of which is a tool, one of said members being mounted for raising and lowering movements and a mechanism for raising and lowering the same including a reversible variable speed motor, one of said members being mounted for horizontal movement, of an automatic differentially-acting controlling device for intermittently operating the motor in either direction at variable speeds, a template, one of which is on the member mounted for horizontal movement and the other of which is relatively stationary, said controlling device having an actuating tracer controlled by the template, and machine actuated means for shifting the position of said template in respect to the work support on said carriage, at the limits of the reciprocating movements of the carriage to compensate for slack and lag in the carriage operating mechanism.

8. The combination with a vertically movable tool, mechanism for raising and lowering the tool including a reversible motor, a reversing switch and resistance in the motor circuit, a travelling work table, and means for operating the table for feeding work thereon to the tool, of a template on the work table, a magnetically operated differentially-acting controlling device for operating the switch and for progressively varying the resistance to change the speed of the motor and including a plurality of spaced contacts and a co-operating movable contact, said spaced contacts being arranged in two series co-operatively arranged one on each side of neutral position of the movable contact, an actuating tracer for the movable contact controlled by the template, and machine actuated means for shifting the position of said template in respect to the work support on said carriage, at the limits of the reciprocating movements of the carriage to compensate for slack and lag in the carriage operating mechanism.

9. The combination with two co-operating members, one of which is a work support and the other of which is a tool, one of said members being mounted for raising and lowering movements, and power means for raising and lowering the same at variable speeds, one of said members being mounted for horizontal movement, of an automatic differentially-acting controlling device for intermittently operating the power means in either direction at variable speeds and a template, one of which is on the member mounted for horizontal movement and the other of which is relatively stationary, said controlling device having an actuating tracer controlled by the template, and machine actuated means for shifting the position of said template in respect to the work support on said carriage, at the limits of the reciprocating movements of the carriage to compensate for slack and lag in the carriage operating mechanism.

10. In a machine of the kind described, a carriage having a work-supporting portion, power means for reciprocating said carriage, a template mounted on said carriage and extended in the direction of the travel thereof, a cutting tool, means for controlling the pattern cutting movement of said tool, said means including said template and a co-operating template-engaging tracer, a mounting for the tool constructed and operative to permit said tool to move under control of said pattern-determining template and means operative at a limit of the reciprocating movements of said carriage to change the relation of said template in respect to the work-supporting portion of said carriage, to thereby compensate for slack and lag in the carriage-operating mechanism.

11. In a machine of the kind described, a carriage having a work-supporting portion, power means for reciprocating said carriage, a template mounted on said carriage and extended in the direction of the travel thereof, a cutting tool, means for controlling the pattern cutting movement of said tool, said means including said template and a co-operating template-engaging tracer, said template being longitudinally shiftable on said carriage, to compensate for slack and lag in the carriage-operating movements, a mounting for the tool constructed and operative to permit said tool to move under control of said pattern-determining template and means actuated by the carriage movement to thus shift said template, at an extreme of the carriage movement.

12. In a mechanism of the kind described, a work support and a cutter support, and means for imparting reciprocating traveling movements to one of said supports in respect to the other, a cutter mounted for vertical movements on said cutter support, a template mounted to travel with the traveling support and extended in the direction of the line of travel, a tracer engageable with said template and arranged to be raised and lowered under traveling movements of the movable support, power means controlled by said tracer movements to cause movements of said cutter toward and from the work according to the design represented by said template, said template being mounted for definite limited endwise movements in respect to said movable support, to compensate for predetermined slack and lag in the power mechanism, at the reversal of the traveling movements of said movable support, and means operative automatically at the reversal of the traveling movements of the movable support to shift said template.

13. In a machine of the kind described, a work support, a cutting tool and means for imparting to-and-fro traveling means of one of said elements in respect to the other, to produce the cutting action, means for controlling the pattern cutting movements of said tool under said relative traveling movements, said means including a pattern determining template and a template-engaging tracer, said template being extended in the direction of said traveling movements and having normally a fixed relation to said work support, but shiftable a definite extent at an extremity of said traveling movements, to compensate for predetermined slack and lag in the means for producing said relative movement, and a mounting for the tool constructed and operative to permit said tool to move under control of said pattern-determining template, in further combination with automatic means actuated by the first noted relatively movable element to cause the shifting movements of said template.

JOHN P. ELLENBECKER.